United States Patent [19]

Dick et al.

[11] Patent Number: 5,012,973
[45] Date of Patent: May 7, 1991

[54] WINDOW AIR CONDITIONING UNIT HAVING A BUILT-IN PROGRAMMABLE THERMOSTAT WITH REMOTE TEMPERATURE SENSOR

[75] Inventors: Pearce Dick, Memphis; Vinay Mehta, Germantown, both of Tenn.

[73] Assignee: Hunter Fan Company, Memphis, Tenn.

[21] Appl. No.: 254,579

[22] Filed: Oct. 7, 1988

Related U.S. Application Data

[63] Continuation-in-part of Ser. No. 236,720, Aug. 26, 1988, abandoned.

[51] Int. Cl.$^5$ .................................................. F23N 5/20
[52] U.S. Cl. .................................... 236/46 R; 236/51; 62/262
[58] Field of Search ................ 236/51, 46 R; 62/262, 62/213

[56] References Cited

U.S. PATENT DOCUMENTS

| | | | |
|---|---|---|---|
| 3,020,976 | 2/1962 | Hyatt | 55/271 |
| 3,785,165 | 1/1974 | Valenzuela, Jr. | 62/262 X |
| 3,995,686 | 12/1976 | Laube | 165/11 |
| 4,144,930 | 3/1979 | Ferdelman | 165/12 |
| 4,206,872 | 6/1980 | Levine | 236/46 R |
| 4,388,692 | 6/1983 | Jones et al. | 364/557 |
| 4,506,827 | 3/1985 | Jamieson | 236/46 R |
| 4,771,392 | 9/1988 | Hall | 364/557 |

FOREIGN PATENT DOCUMENTS

| | | |
|---|---|---|
| 0193968A2 | 7/1983 | European Pat. Off. . |
| 0266460A1 | 11/1986 | European Pat. Off. . |
| 3308099A1 | 9/1984 | Fed. Rep. of Germany . |
| 0077536 | 9/1962 | Japan ............ 236/51 |
| 60-64146(A) | 12/1985 | Japan ............ 55/271 |
| 62-68513 | 3/1987 | Japan ............ 55/271 |
| 8104762-3 | 2/1985 | Sweden ............ 236/51 |
| 2051421A | 5/1980 | United Kingdom . |

*Primary Examiner*—William E. Wayner
*Attorney, Agent, or Firm*—Banner, Birch, McKie & Beckett

[57] ABSTRACT

A room air conditioning system is provided which includes an individual air conditioning unit adapted to regulate the temperature within a predetermined volume of space. A programmable thermostat is integral with the air conditioning unit. The programmable thermostat includes a remote temperature sensor for sensing the ambient temperature of the predetermined volume of space at a location remote from the programmable thermostat and a timer for generating the current time of day. The thermostat further includes a memory for storing a plurality of program times and a plurality of control temperatures corresponding to the program times. A controller of the thermostat selectively controls the on/off state of the individual air conditioning unit in response to (1) a comparison of the current time of day with the program time stored in the memory to access the corresponding current control temperature stored in the memory and (2) a comparison of the current ambient temperature sensed by the sensor and the current control temperature stored in the memory to generate a control signal for the individual air conditioning unit.

8 Claims, 8 Drawing Sheets

WINDOW AIR CONDITIONING UNIT HAVING A BUILT-IN PROGRAMMABLE THERMOSTAT WITH REMOTE TEMPERATURE SENSOR

This application is a continuation-in-part of commonly assigned, copending U.S. application Ser. No. 236,720 filed Aug. 26, 1988 now abandoned.

BACKGROUND OF THE INVENTION

The present invention generally relates to air conditioning units and, more particularly, to a window air conditioning unit having a built-in programmable thermostat with a remote temperature sensor.

Window air conditioning units provide a viable alternative to central air conditioning systems in apartment buildings and offices which lack such central systems and in homes where it is either impractical or prohibitively expensive to install them. An important consideration in the purchase and installation of an air conditioning unit is the cost of operating the unit. An inefficiently operated air conditioner can result in substantial energy costs.

Generally, window air conditioning units are switched on as needed to cool the room in which the unit is installed. However, such a method of operation can result in inefficient air conditioner use and increased energy costs. For example, a user may forget to switch off the air conditioner, resulting in a waste of energy, particularly when the room is unoccupied. A user may also forget to switch on the air conditioner, resulting in discomfort while the unit is bringing the temperature down to a comfortable level.

Additional problems may arise when an air conditioning unit is utilized to cool a room by a particular time. This situation may occur, for example, when the air conditioner is used in a bedroom to cool the room overnight while the occupant sleeps. The user may turn on the air conditioner when he or she gets home from work at, for example, 6:00 p.m., in order to ensure that the room be cool by the time he or she retires at 11:00 p.m. However, it may only be necessary to turn on the air conditioner at 10:15 p.m. to sufficiently cool the room by 11:00 p.m. Thus, the energy used in cooling the room from 6:00 p.m. to 10:15 p.m. is wasted.

In addition, it is also desirable to provide a user with different information related to the air conditioner operation. For example, the user may want to know how long his air conditioner operates on a daily or weekly basis in order to calculate the operating costs and, if necessary, implement energy conservation efforts. The user may also want information related to air conditioner filter use.

Also, it is desirable to have the air conditioning unit switched on and off in accordance with an ambient temperature determination representative of the ambient temperature sensed by room occupants.

SUMMARY OF THE INVENTION

Accordingly, it is an object of the present invention to provide a room air conditioning unit having programmability.

It is another object of the present invention to provide such digital programmability in a thermostat built into the air conditioning unit.

It is still another object of the present invention to provide remote temperature sensing capability for the built-in thermostat.

It is still another object of the present invention to provide an air conditioning unit which may be operated in an energy efficient manner.

According to the present invention, a room air conditioning system is provided which includes an individual air conditioning unit adapted to regulate the ambient temperature of a predetermined volume of space. A programmable thermostat is integral with the air conditioning unit. The programmable thermostat includes a remote temperature sensor for sensing the ambient temperature of the predetermined volume of space at a location remote from the programmable thermostat and a timer for generating the current time of day. The thermostat further includes a memory for storing a plurality of program times and a plurality of control temperatures corresponding to the program times. A controller of the thermostat selectively controls the on/off state of the individual air conditioning unit in response to (1) a comparison of the current time of day with the program times stored in the memory to access the corresponding current control temperature stored in the memory and (2) a comparison of the current ambient temperature sensed by the sensor and the current control temperature stored in the memory to generate a control signal for the individual air conditioning unit.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

Figure 1:
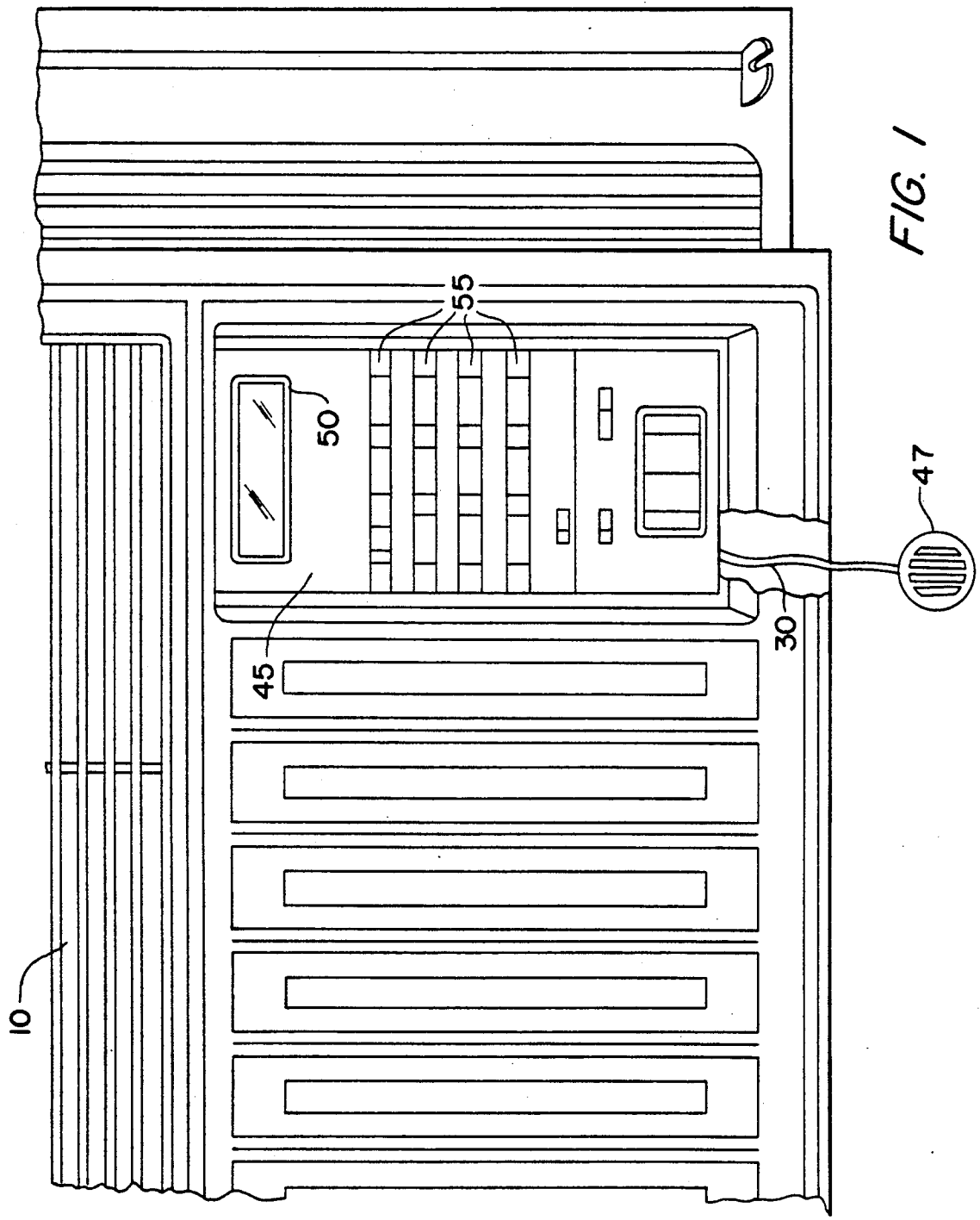
FIG. 1 is an illustration of an air conditioning unit having a built-in programmable thermostat with remote temperature sensor.

FIG. 1 illustrates a window air conditioning unit in accordance with the present invention. Window air conditioner 10 includes built-in programmable thermostat 45 for controlling the operation of the unit. Built-in programmable thermostat 45 includes remote temperature sensor 47 coupled to thermostat 45 by cord 30. Thermostat 45 further includes display 50 and input keys 55. Input keys 55 may be utilized to input programming information to thermostat 45. Thermostat 45 may be powered by AC line power or DC battery power. Battery power may also serve as a back-up power source during power failures to maintain the programs in memory and maintain the real time clock operation.

Figure 2:
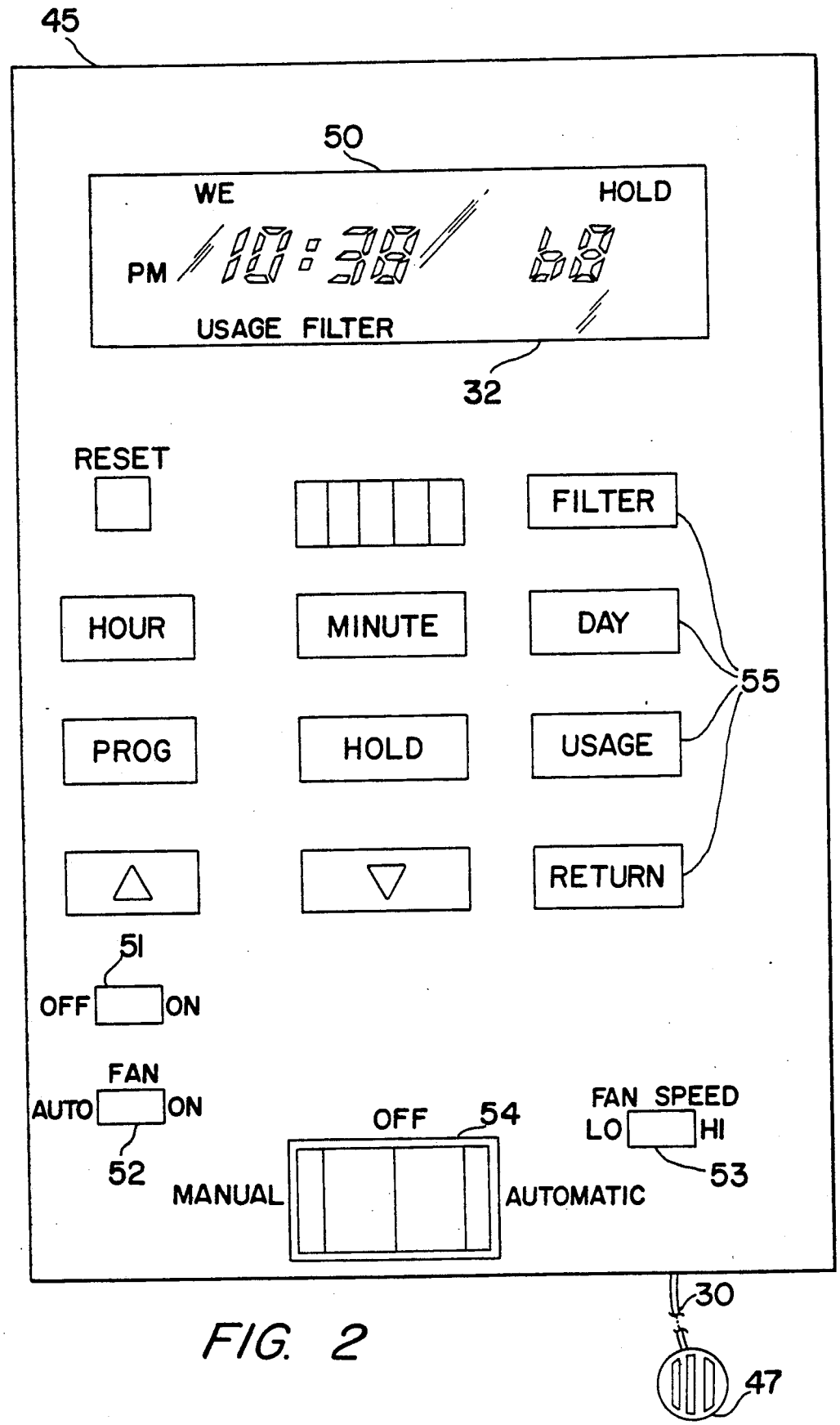
FIG. 2 illustrates the built-in programmable thermostat shown in FIG. 1.

FIG. 2 illustrates in more detail the features of built-in programmable thermostat 45. Thermostat 45 has a display 50 which includes a digital clock having a liquid cyrstal display which displays information such as the time of day in hours and minutes, an A.M. or P.M. indicator, the day of the week, the current room temperature, the current program number, a low battery indicator, and an on/off indicator for the air conditioner. Additional information to be described below may also be displayed.

Keys 55 include an HOUR, a MIN, and a DAY key for respectively entering the hour of the day, the minute of the day and the day of the week. The PROG key is used for reviewing or entering the various program cycles. The HOLD key permits a user to override any programmed temperature settings for an extended period of time by keying in a new temperature setting. The HOLD key also permits manual operation of the thermostat. The RETURN key returns display 50 to the current time and temperature. If pressed for three seconds, the RETURN key also returns thermostat 45 from a manual override mode. The USAGE key is an energy monitor key which recalls and displays energy usage for the present day and the previous day. Display 50 preferably shows energy usage in hours and minutes, although displays of kilowatts, kilowatt hours and accumulated cost may also be provided. The FILTER key recalls and displays the total usage of the air conditioning filter in hours. The arrow push buttons are used to raise or lower temperature settings. Thermostat 45 also includes on/off switch 51, fan switches 52 and 53 and switch 54 for operating the unit in manual or automatic mode.

Additional keys not shown in FIG. 2 may also be included. A temperature SPAN key may be used to set high and low temperature limits to provide increased control of the on and off cycling of air conditioner 10 for better regulation of the room temperature. Additional feature keys are shown, for example, in the hand-held remote of FIG. 3 discussed in detail below.

These various features and the method of programming thermostat 45 will now be discussed in detail. In order to set the current time and day of week, the HOUR and MIN keys are respectively depressed until the correct hour and minutes are displayed on display 50. The day is set by repeatedly depressing the DAY key until the correct day appears.

The thermostat may be programmed by use of the PROG key. After depressing the PROG key, the clock may be advanced to the desired program time by use of the hour and minute keys. The program temperature may be set by use of the arrow keys to raise and lower the temperature. Subsequent depressions of the PROG key permit additional programs to be entered into the thermostat. Each of the programmed time and temperature settings is associated with a program number which is displayed on display 50 while that program is active. Program number 3, indicated by numeral 32, is illustrated on display 50.

Programmability of thermostat 45 is a powerful and important feature of the present invention. A unique feature of this room air conditioning unit is its built-in programmability. This programmability permits a user to program a plurality of temperature settings for a plurality of program times. Programmability allows high efficiency operation and can result in substantial energy savings. For example, if an air conditioning unit having built-in programmability is utilized to cool the living room of a house or apartment, the on/off switching of the air conditioning unit may be precisely predetermined. It is desirable to have the room cooled during times of occupancy but, in the interest of energy conservation, it is further desirable to have the unit switched off during times of non-occupancy. The present invention permits the user to program a cooling schedule such that the air conditioner may be switched on at, for example, 5:00 p.m. to cool the room to a programmed temperature of 76° F. by 6:00 p.m. when the user returns home from work. The programmed temperature of 76° may be maintained by the thermostat until 11:00 p.m. when the occupants go to bed. The air conditioner may then be programmed to maintain the living room at, for example, 80° overnight in order to conserve energy. It may further be desirable to have the temperature lowered to 76° during some part of the morning, say 7:30 a.m. to 9:00 a.m. The temperature may then be set-up to 85° during the day from 9:00 a.m. –5:00 p.m. in order to conserve energy. It is important that the temperature not be permitted to rise too much during the unoccupied periods or the unit may require so much energy to bring the ambient room temperature down to the program temperature that energy savings are eliminated.

The various programs may be created and modified to suit the user's lifestyle. Different programs may be entered to control the air conditioner over weekends, for example, when a user is likely to be home at different hours.

Further, the programmable thermostat of the present invention is built into the air conditioning unit. This provides easy access to the user and does not require complicated hook-ups or connections. In addition, no wires or cords are stretched throughout the room. Complete air conditioner control including programming takes place at the air conditioning unit itself. If the unit is positioned such that it may not be readily accessible, the unit may be addressed by a hand-held remote control as described below. This may be particularly useful for those who are bedridden or who simply desire the convenience of utilizing hand-held remote control as with televisions and stereos. The air conditioning units having built-in thermostats may be manufactured economically and do not require the user to make an additional purchase to implement programmability.

Another feature of thermostat 45 is the provision of remote temperature sensor 47. Remote sensor 47 may be extended from thermostat 45 in order to position the sensor away from the air conditioning unit. Remote temperature sensor 47 is preferably a thermister-type temperature sensor, although the invention is not limited in this respect. Extension cord 30, preferably having a length of 18 inches, couples remote sensor 47 to thermostat 45. Remote sensor 47 permits measurement of an ambient room temperature which is more representative of the actual temperature sensed by an occupant of the room. Thus, remote sensor 47 may be positioned in a more central portion of a room away from the air conditioning unit. Thus, ambient temperature determination is not limited to the walls or corners of a room, which can provide an inaccurate measure of the temperature sensed by room occupants.

Figure 7:
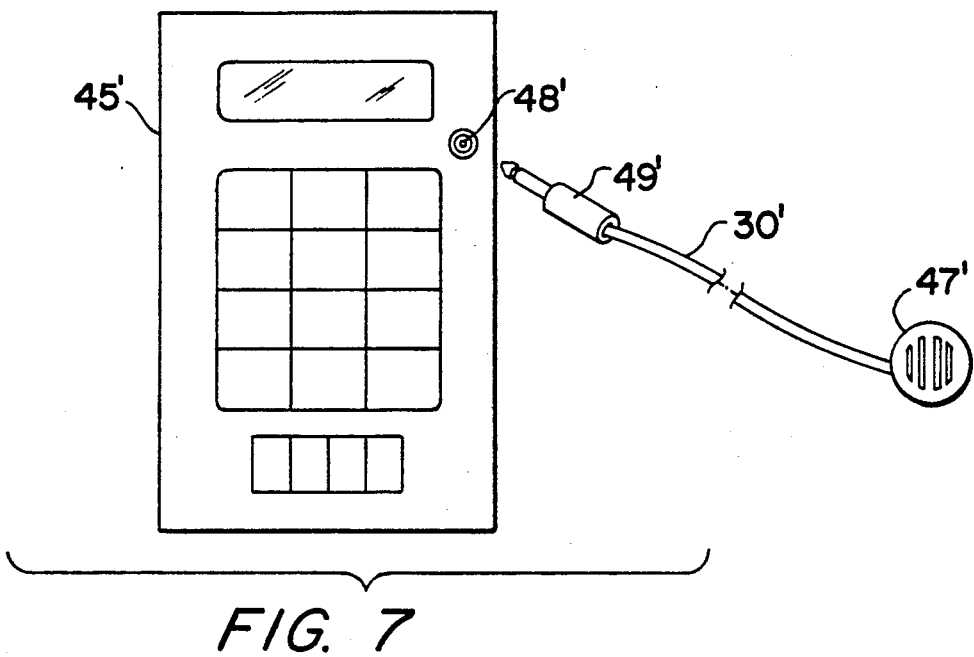
FIG. 7 illustrates a built-in programmable thermostat in accordance with another embodiment of the present invention.

In an alternative embodiment shown in FIG. 7, remote sensor 47' is externally coupled to thermostat 45' through jack 48'. Cord 30' of remote sensor 47' includes a plug 49' on one end thereof. Plug 49' is adapted to be coupled to jack 48' of thermostat 45'. Such connections are conventional and their details will not be discussed here. Generally, the length of cord 30' may be several feet and typically is approximately 4 feet. Remote sensor 47' permits measurement of an ambient temperature more representative of the ambient temperature sensed by room occupant. Because of the external coupling, it is possible for a user to purchase a remote temperature sensor having a cord whose length is suitable for his or her needs.

Figure 8:
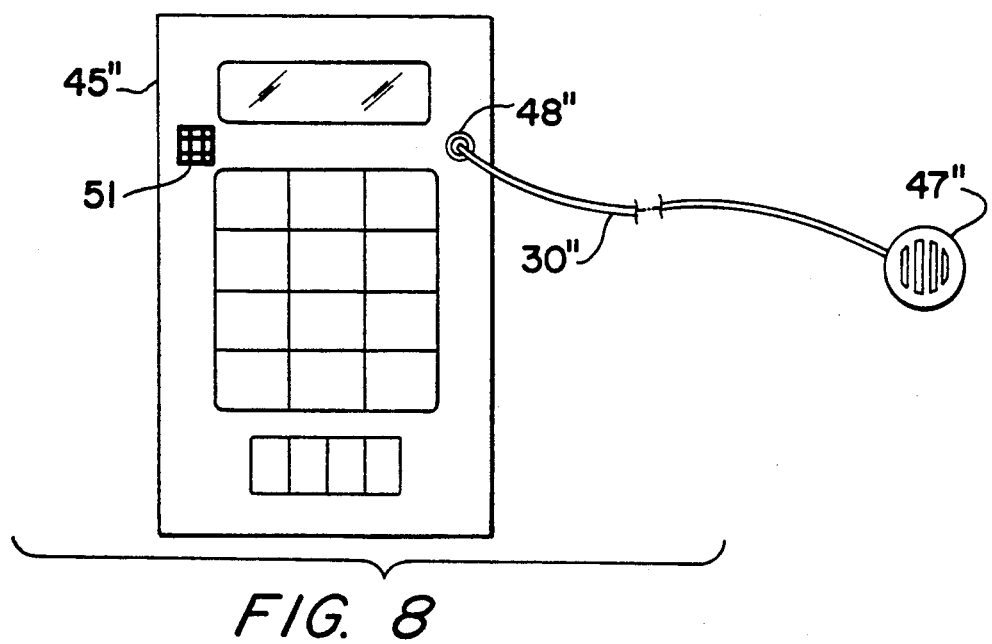
FIG. 8 illustrates a built-in programmable thermostat in accordance with still another embodiment of the present invention.

In another embodiment shown in FIG. 8, programmable thermostat 45" includes built-in temperature sensor 51. Built-in temperature sensor 51 is preferably a thermister-type temperature sensor although the invention is not limited in this respect. Built-in-sensor 51 measures the ambient temperature to determine the on/off switching of the air conditioning unit. Thermostat 45" is further capable of being selectively coupled to remote sensor 47". Cord 30" of remote sensor 47" includes a plug 49" on one end thereof. Plug 49" is adapted to be coupled to jack 48". Again, the use of a remote sensor permits measurement of an ambient temperature more representative of the ambient temperature sensed by room occupants. When remote sensor 47" is plugged in, built-in sensor 51 is disabled.

Figure 6:
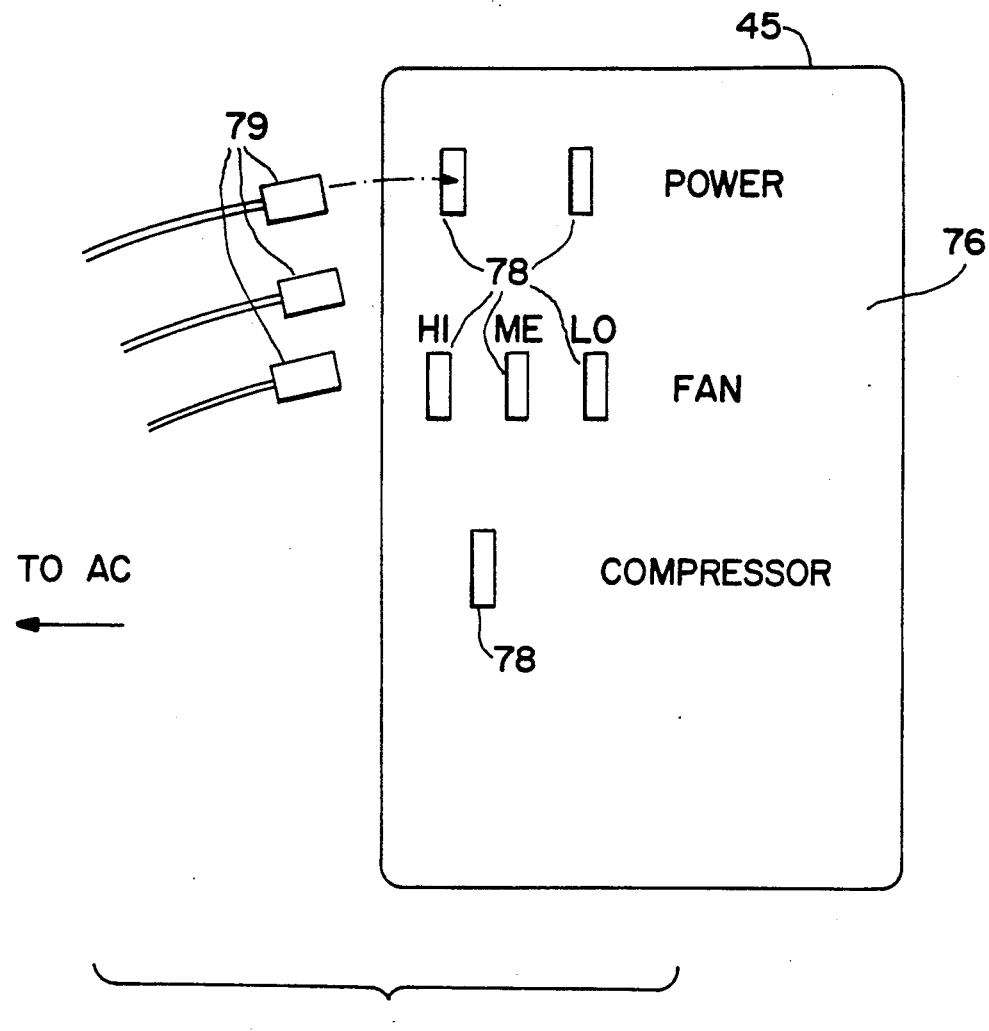
FIG. 6 schematically illustrates the connection of the thermostat and air conditioner according to one embodiment of the present invention.

The thermostat is preferably manufactured as a module. The rear of the module, generally indicated as 76 in FIG. 6, includes clamp terminals 78. The thermostat module may be coupled to the air conditioning unit by clamp connectors 79. Clamp connectors 79 will couple the thermostat module to the air conditioner compressor and fan units. Clamp connectors 79 will also couple power from the main AC line to the thermostat.

The arrow keys on thermostat 45 may be used to override a programmed temperature setting. The override mode permits a user to instruct the thermostat to ignore program setting without requiring the thermostat to be reprogrammed. Using temporary manual override, the temperature setting may be raised or lowered to a temporary setting until the next program time. The temperature may be changed by use of the arrow keys and the thermostat will remain in manual override until the next program time. The thermostat may be permanently manually overridden for an extended period of time, such as a vecation, by following the above procedure and then depressing the HOLD key. To return back to the programmed temperature scheme from a permanent manual override mode, the RETURN key may be depressed for three seconds.

An energy monitoring operation measures and logs the amount of time air conditioner 10 operates over a given time interval. With the USAGE key, the total energy usage may be displayed for the prsent day (as of 12:01 AM), or the previous day (12:01 AM through midnight). By monitoring the energy used on a daily basis, the user can gradually adjust the temperature setting and monitor the effect of energy consertion efforts. A single depression of the USAGE key displays the amount of time in hours and minutes that air conditioner 10 has operated on the present day. A second depression of the USAGE key displays the amount of time the system operated on the previous day. Alternatively, display 50 may indicate the number of kilowatts, kilowatt hours, or cumulative cost of running the air conditioner. The time period over which the actual usage is logged may alternatively be a week or any other length of time.

Figure 4:
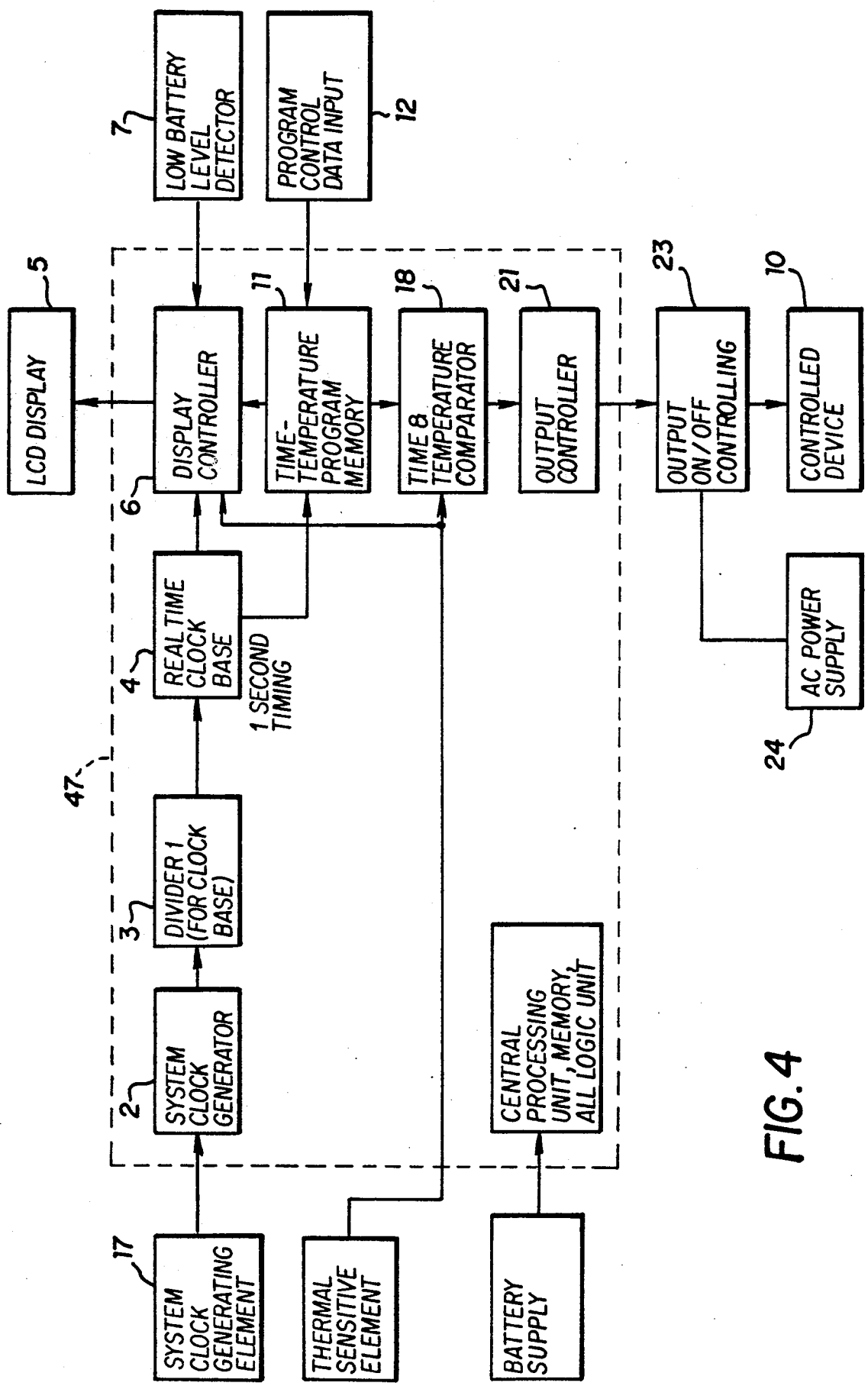
FIG. 4 is a hardware diagram of a thermostat in accordance with an embodiment of the present invention.

A hardware diagram of thermostat 45 is shown in FIG. 4. Thermostat 45 includes single chip microcomputer 47 having a Read Only Memory (ROM) for software and a Random Access Memory (RAM) for data storage. The component blocks bounded by the broken lines in FIG. 4 are contained within microcomputer 47.

System clock generator 2 generates the timing signal for the microcomputer in response to system clock generating element 1. Clock generating element 1 may, for example, be a 32768-cycle crystal. The timing signal generated by clock generator 2 is divided repeatedly by divider 3 to generate a one second timing signal for real time clock base 4. The real time clock tracking of clock base 4 is necessary for the programming (sofware) features of the thermostat. Real time clock base 4 also provides a signal of display controller 6 which generates the time of day display for LCD 5. If batteries are used to power thermostat 45, low battery level detector 7 determines when new batteries are needed for the thermostat and provides a signal to display controller 6 illuminate or flash a low battery prompt on LCD 5. Alternatively, the display digits may flash to indicate low battery level.

Component block 12 is a program control data input which is preferably keys on programmable thermostat 45. The program data input to the thermostat 45 via these keys is stored in memory 11. Each second, microcomputer 47 compares the program times stored in memory 11 and the real time to determine whether a new cooling setpoint temperature is required. When the real time matches a program time, the program temperature corresponding to that program time becomes the reference temperature against which the ambient room temperature sensed by thermal sensitive element 8 is compared by comparator 18 to determine the operating state of air controlled device 25, i.e., the air conditioning unit. When certain on/off criteria related to the program temperatures are reached, an on/off switching signal is sent to output controller 21 to control the operating state of controlled device 25. Thermostat 45 may be powered battery supply 28 or, alternatively, A.C. power supply 24. A.C. power supply 24 is coupled to controlled device 25 to supply power thereto.

Figure 5:
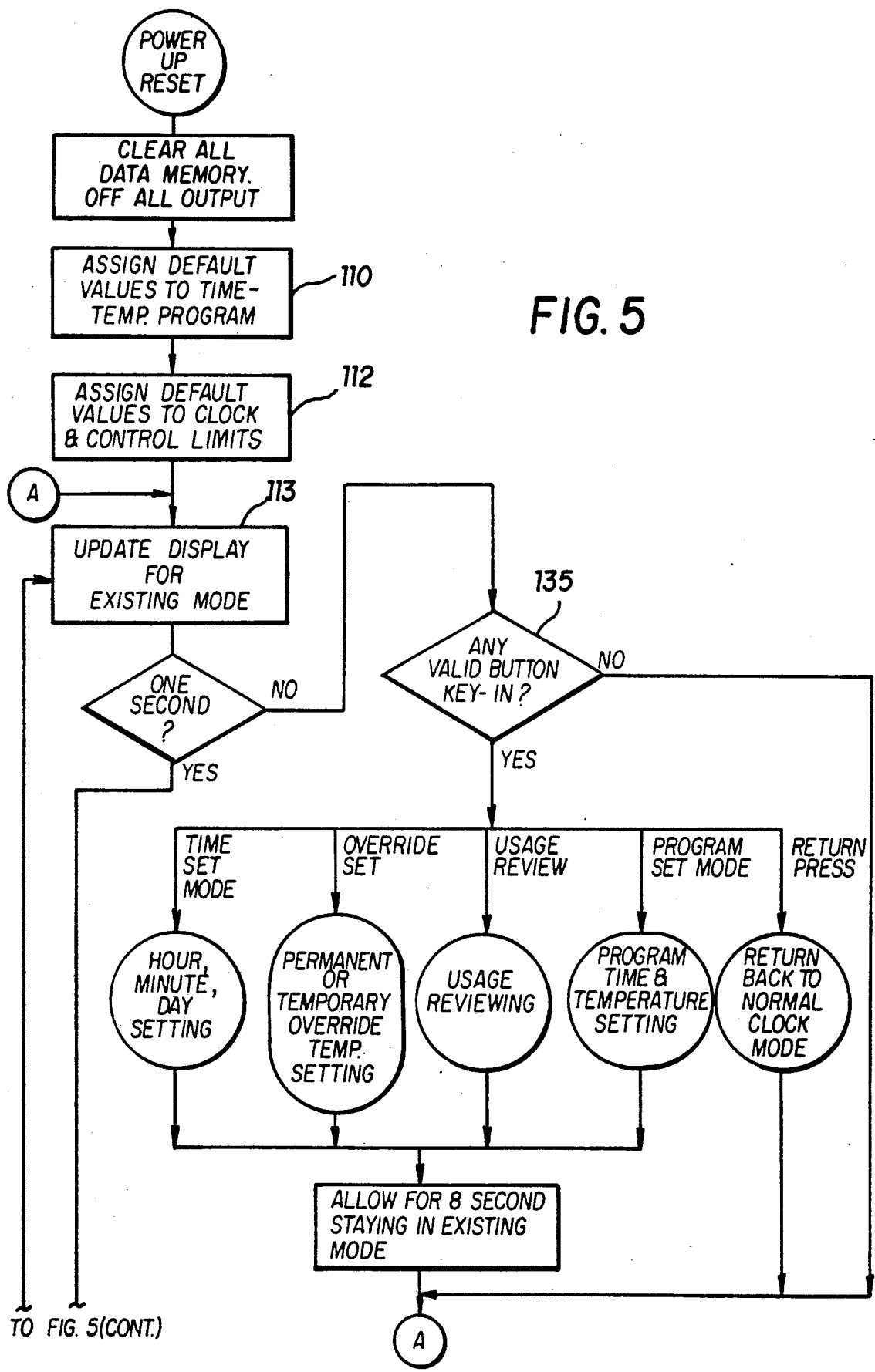
FIG. 5 is a flow chart illustrating the operation of the themostat of FIG. 4.
Figure 5:
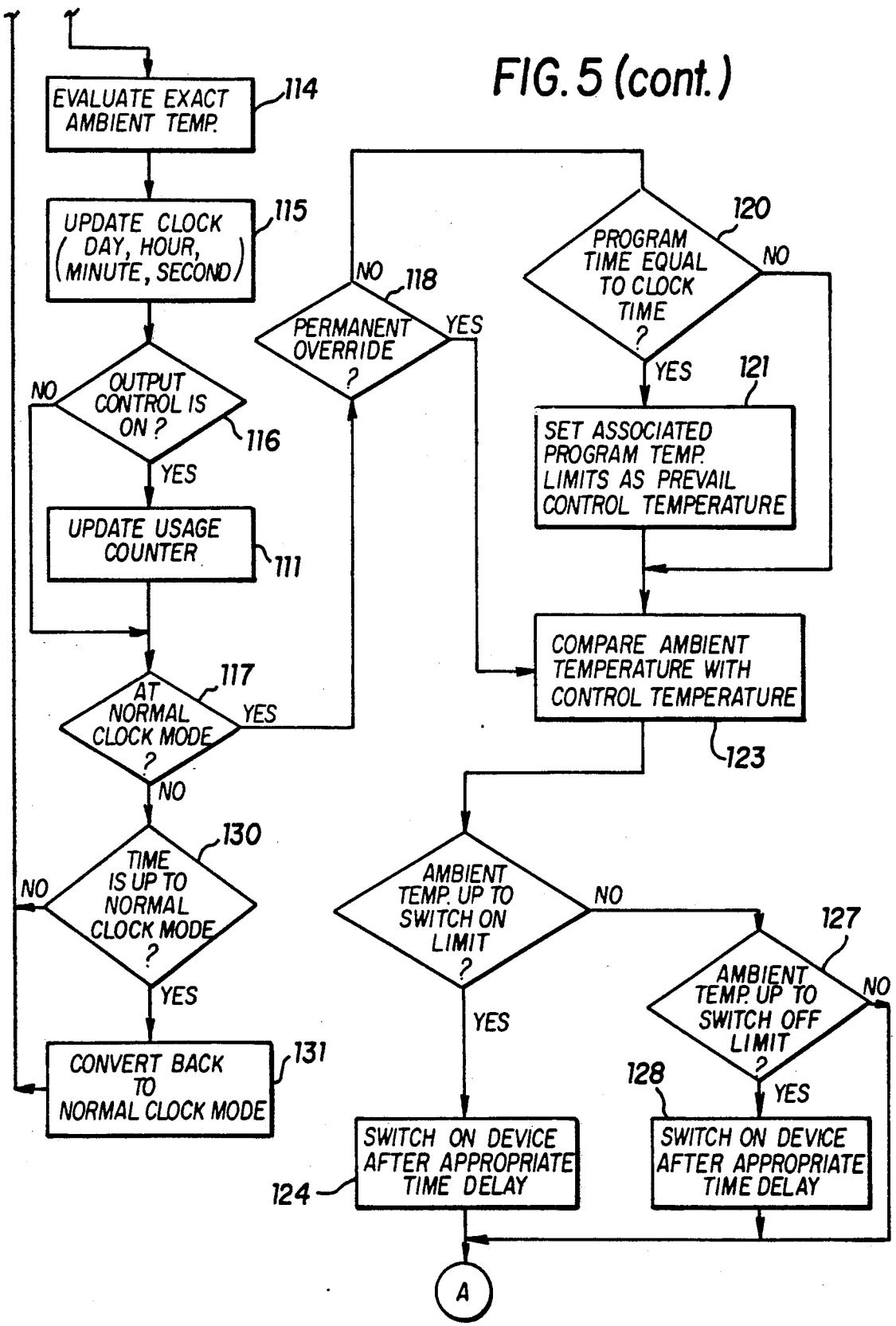

The operation of thermostat 45 will be explained with reference to the flow chart FIG. 5. Upon power-up, all data in the memory is cleared and the output is off. At step 110, default values are assigned to the time-temperature program. At step 112, default values are assigned to the clock and temperature control limits. Next, at step 113, the display is updated for the existing mode. After each one second real time interval, the exact ambient temperature is evaluated at step 114. The real time clock display of day, hour, minutes, and seconds is updated at step 115. At step 116, if the output control is in the ON state, the update usage counter is incremented at step 116. Otherwise, control immediately passes to step 117. The update usage counter permits the energy monitoring function described above.

At step 117, a determination is made if the thermostat is in normal clock mode (to be described below). If so, a determination is made at step 118 whether permanent override is in effect. If permanent override is not in effect, a determination is made at step 120 whether the program time is equal to the real clock time. If so, the associated program temperature is set as the prevailing control temperature at step 121. If not, control passes to step 123 where a comparison is made between the ambient temperature and the prevailing control temperature.

If, at step 118, premanent override is in effect, control immediately passes to step 123. If the ambient temperature is such as to require the switching on of the air conditioning unit, the air conditioner is switched on at step 124 after an appropriate predetermined time delay and control returns to step 113. If the ambient temperature is not such as to require the switching on of the air conditioning unit, a determination is made at step 127 whether the ambient temperature is such that the air conditioning should be switched off. If so, the air conditioning unit is switched off after an appropriate predetermined time delay at step 128 and control returns to step 113. If not, control immediately returns to step 113.

If at step 117, the thermostat is not in normal clock mode, control passes to step 130 where a determination is made whether the time is up to normal clock mode. If not, control passes back to step 113. If so, the thermostat converts back to normal clock mode at step 131 and control subsequently passes back to step 113.

Normal clock mode refers to the thermostat mode in which the current time and current temperature are displayed. However, when the thermostat is in programming mode, override mode, usage review mode, etc., the thermostat is no longer in the normal clock mode. Decisions are made in the normal clock mode only. Thus, updating the temperature, the on/off switching of the air conditioner, the checking of program temperatures, ect. are performed in normal clock mode only. In other words, while a user is programming the thermostat, no descisions are made for safety reasons.

The microprocessor for the thermostat also checks for any key entries by the user at step 135. FIG. 5 illustrates several modes which the thermostat may be entered by key operations. A time set mode permits setting of the hour, minute, and day. An override mode permits a permanent or temporary override of the temperature settings. A usage review mode permits a user to view the amount of time the air conditioning unit has been on during some predetermined time interval, e.g. a day or a week. A program set mode permits the user to set program times and temperatures. Each of the above modes is active for 8 seconds after the respective key operations. The return mode returns the thermostat to the normal clock mode and control returns to step 113. After the 8 second active period, control also returns to step 113.

The thermostat also preferably includes a filter usage function for logging and displaying the total usage of the air conditioner filter. The filter time log may be displayed in hours or in hours and minutes. The thermostat preferably includes an automatic reminder after the filter has been in use for some predetermined time period. For example, at 250 hours the word "FILTER" may appear on the display reminding the user to change the filter and reset the counter back to zero. The "FILTER" display will continue if the counter is not set back to zero. Such a reminder serves as an indication to clean or replace the air conditioning filter of maximum efficiency of operation and increased energy savings.

The elapsed filter usage and the energy monitoring system may be maintained by conventional techniques such as counters or timers in the thermostat. Other techniques may also be used. In addition, it is possible, for example, for the filter monitor to comprise a decrementing counter which may be present by the user for a predetermined time period equal to the filter lifetime. The LCD display may provided an indicator when the counter reaches 0 or some other predermined value. Alternatively, an audible warning may be provided. Such a pre-programmed time period may also be utilized to warn the user by a visual display or audible warning of excess use of the air conditioner. An additional built-in timer may be provided to prevent damage to the air conditioner compressor caused by rapid cycling by providing a predetermined delay, four minutes for example, before it will restart. This same delay may be provided upon power being restored after a main power failure. Whenever the main power is interrupted or fails for an extended period of time, battery power may be used to retain the programs and current time.

The thermostat may also include a temperature spen feature. The thermostat may be programmed to cycle when the temperature rises 2° above or 1° below the current prevailing temperature setting. For example, if the air conditioner is programmed to maintain a 75° setting, the unit will cycle on when the room temperature reaches 77° (2° above the set point of 75°) and stay on until the temperature is 74° (1° below the set point of 75°).

Figure 3:
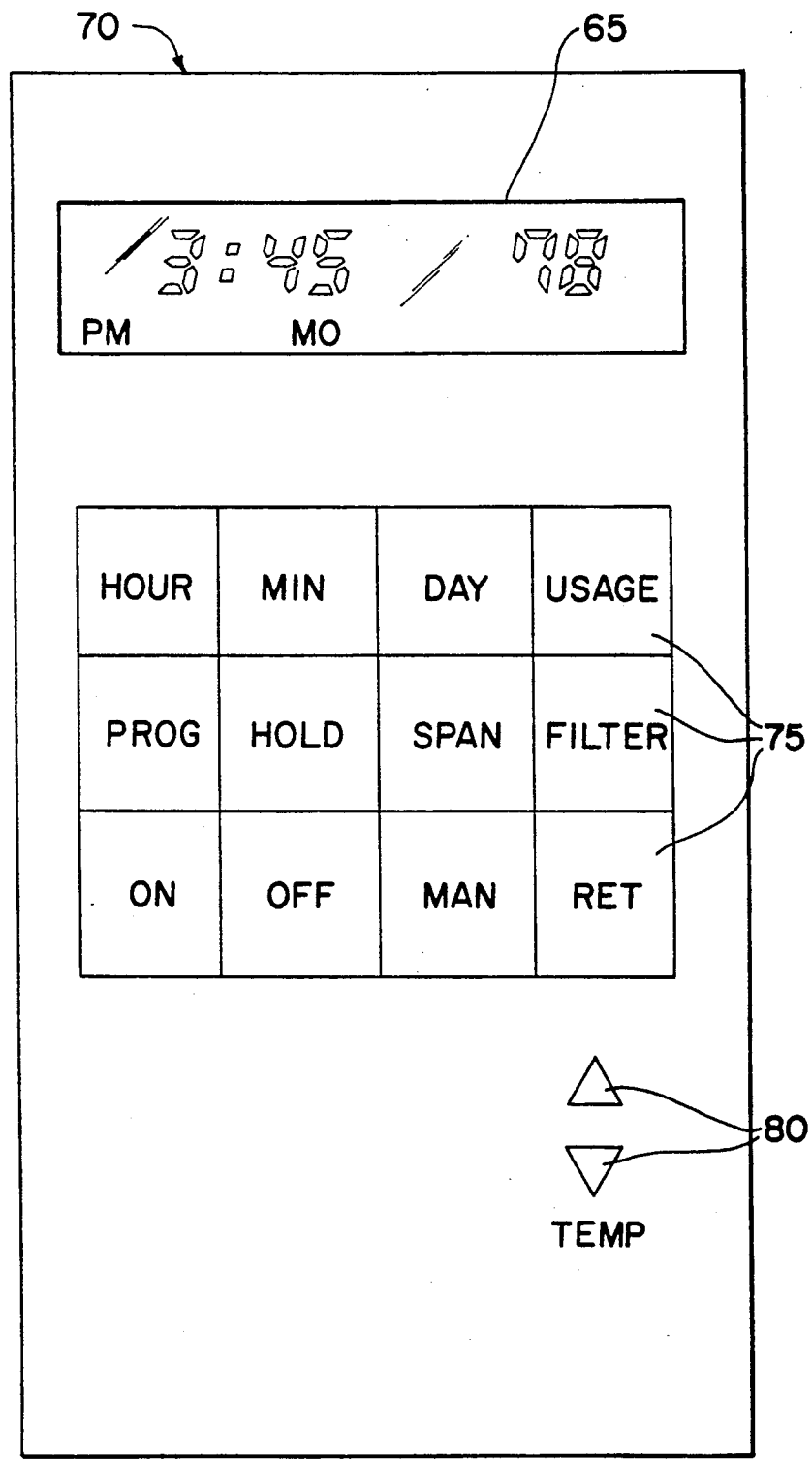
FIG. 3 shows a hand-held remote for use with the air conditioning unit of FIG. 1.

The programmable built-in thermostat may be addressed by an infrared hand-held remote. Such a remote is shown in FIG. 3 and is similar in operation to a hand-held remote commonly used with televisons and stereos. Transmission of signals from the remote to the built-in programmable thermostat is conventional, and is not described herein in any detail. Remote 71 includes LCD 65 for displaying information such as day, time, and temperature settings. Remote 70 also includes a plurality of keys. The remote may be programmed and the information transmitted to the plug in thermostat. Thus use of a hand-held remote facilitates programming. Programming steps utilizing hand-held remote 70 are the same as those described above for thermostat 45.

The invention has been described in detail in connection with the preferred embodiments. These embodiments, however, are merely for example only and the invention is not restricted thereto. It will be easily understood by those skilled in the art that other variations and modifications can easily be made within the scope of this invention as defined by the appended claims.

We claim:

1. A room air conditioning system comprising:
    an individual air conditioning unit adapted to regulate the ambient temperature of a predetermined volume of space; and
    a programmable thermostat intergral with said individual air conditioning unit for selectively controlling the on/off switching of said individual air conditioning unit in response to comparisons between the ambient temperature and control temperatures programmed in said programmable thermostat, said programmable thermostat having a first ambient temperature sensing mode utilizing first temperature sensor means built into said programmable thermostat for sensing the ambient temperature of the predetermined volume of space and a second ambient temperature sensing mode utilizing a second temperature sensor means selectively coupled to said programmable thermostat for sensing the ambient temperature of the predetermined volume of space at a location remote from said programmable thermostat.

2. The room air conditioning system according to claim 1 wherein said programmable thermostat is adapted to be addressed from a remote location by a hand-held remote control.

3. A programmable thermostat for selectively controlling the on/off switching of an individual air conditioning unit in response to comparisons between the ambient temperature of a predetermined volume of space and control temperatures programmed in said programmable thermostat, said programmable thermostat having a first ambient temperature sensing mode utilizing first temperature sensor means built into said programmable thermostat for sensing the ambient temperature of the predetermined volume of space and a second ambient temperature sensing mode utilizing a second temperature sensor means selectively coupled to said programmable thermostat for sensing the ambient temperature of the predetermined volume of space at a location remote from said programmable thermostat.

4. The programmable thermostat according to claim 3 wherein said programmable thermostat is built into said individual air conditioning unit.

5. The programmable thermostat according to claim 3 wherein said programmable thermostat is adapted to be addressed by an infrared remote.

6. A thermostat for controlling the on/off switching of an individual air conditioning unit, said thermostat comprising:
first temperature sensor means built into said thermostat for sensing the ambient temperature of the predetermined volume of space;
second temperature sensor means for sensing the ambient temperature of the predetermined volume of space at a location remote from said programmable thermostat;
control means for controlling the on/off switching of said individual air conditioning unit in response to comparisons between a control temperature and the ambient temperature sensed by either said first temperature sensor means or said second temperature sensor means.

7. The thermostat according to claim 6 wherein said second temperature sensor means is adapted to be selectively coupled to said thermostat.

8. The thermostat according to claim 6 wherein said thermostat comprises a programmable theremostat.

* * * * *

UNITED STATES PATENT AND TRADEMARK OFFICE
CERTIFICATE OF CORRECTION

PATENT NO. : 5,012,973

DATED : May 7, 1991

INVENTOR(S) : Dick Pearce and Vinay Mehta

It is certified that error appears in the above-identified patent and that said Letters Patent is hereby corrected as shown below:

On the title page Section [19], delete "Dick et al." and insert --Pearce et al.--;

On the title page Section [75], Inventors: delete in its entirety and insert --Dick Pearce, Memphis; Vinay Mehta, Germantown, both of Tenn.--

Signed and Sealed this

Third Day of November, 1992

Attest:

DOUGLAS B. COMER

Attesting Officer      Acting Commissioner of Patents and Trademarks

UNITED STATES PATENT AND TRADEMARK OFFICE
CERTIFICATE OF CORRECTION

PATENT NO. : 5,012,973

DATED : May 7, 1991

INVENTOR(S) : Pearce, et al.

It is certified that error appears in the above-identified patent and that said Letters Patent is hereby corrected as shown below:

Col. 1, line 61, after the word "having" insert --digital--.

Col. 8, line 29, delete the numeral reference "71" and insert --70--

Signed and Sealed this

Twentieth Day of April, 1993

Attest:

MICHAEL K. KIRK

Attesting Officer

Acting Commissioner of Patents and Trademarks